United States Patent [19]
Cookes

[11] 3,827,747
[45] Aug. 6, 1974

[54] ADJUSTABLE SEAT FOR AN INDUSTRIAL TRUCK

[75] Inventor: Austin C. Cookes, Birmingham, England

[73] Assignee: Clark Equipment Company, Buchanan, Mich.

[22] Filed: Oct. 5, 1972

[21] Appl. No.: 295,411

[52] U.S. Cl................ 296/65 R, 248/371, 297/335
[51] Int. Cl.............................................. B60n 1/02
[58] Field of Search.................. 296/65 R; 297/335; 248/371; 280/150 C

[56] References Cited
UNITED STATES PATENTS

| | | | |
|---|---|---|---|
| 460,784 | 10/1891 | Mercer | 297/335 X |
| 3,522,970 | 8/1970 | Francis | 297/335 |
| 3,687,484 | 8/1972 | Cosby | 280/150 C |

Primary Examiner—David Schonberg
Assistant Examiner—John A. Pekar
Attorney, Agent, or Firm—John C. Wiessler

[57] ABSTRACT

A device for biasing to a forwardly tilted position in an industrial truck a seat assembly of the type which can be swung outwardly from a forwardly facing operative position to a rearwardly facing non-operative position for the purpose of enabling easy removal and installation of storage batteries in electric fork trucks. The biasing device normally spring loads the seat assembly to said tilted position so as to facilitate such manipulation of the seat.

3 Claims, 8 Drawing Figures

3,827,747

ADJUSTABLE SEAT FOR AN INDUSTRIAL TRUCK

BACKGROUND OF THE INVENTION

This invention comprises an improvement in application Ser. No. 196,648, filed Nov. 8, 1971, which is a division of application Ser. No. 34,713, filed May 5, 1970, now U.S. Pat. No. 3,687,484, both in the name of Henry L. Cosby and both assigned to the assignee of the present application.

DESCRIPTION OF THE PREFERRED EMBODIMENT

Figure 1:
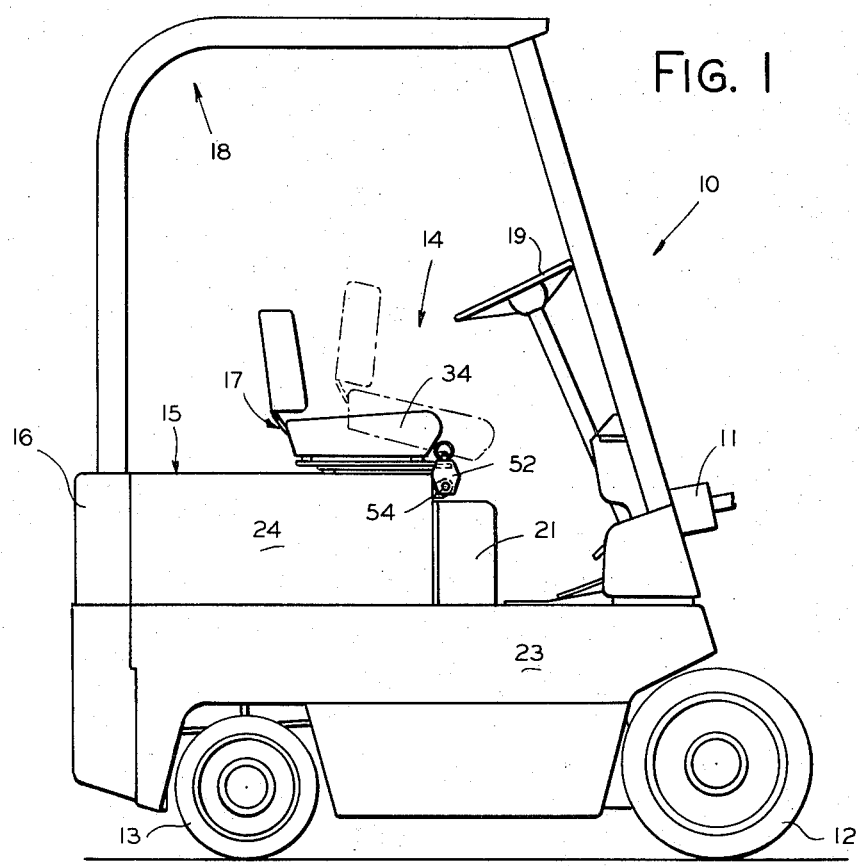
FIG. 1 is a side view in elevation of my invention applied to an electric powered industrial lift truck.

Referring now to the drawing, numeral 10 designates an electric counterbalanced lift truck which includes a conventional fork lift mast assembly, not shown, mounted from the front axle for tilting movement by a pair of tilt cylinder assemblies, one of which is shown at numeral 11, forward drive wheels 12, rear steer wheel 13, an operator and control station 14, a battery compartment 15 formed within the truck body beneath an operator's swing-out seat assembly generally designated at 17, and a counterweight and main frame 16 and 23. An overhead guard assembly is illustrated at numeral 18.

The operator's station 14 includes the usual lift truck controls such as a steer wheel 19, instrumentation panel 20, lift, lower and tilt controls for the mast assembly, accelerator and brake controls, truck motor control circuitry being housed in the compartment within cover 21 immediately adjacent a forward body plate 22, and the like, none of said truck controls or the operating components associated therewith being of relevance insofar as the present invention is concerned.

Figure 2:
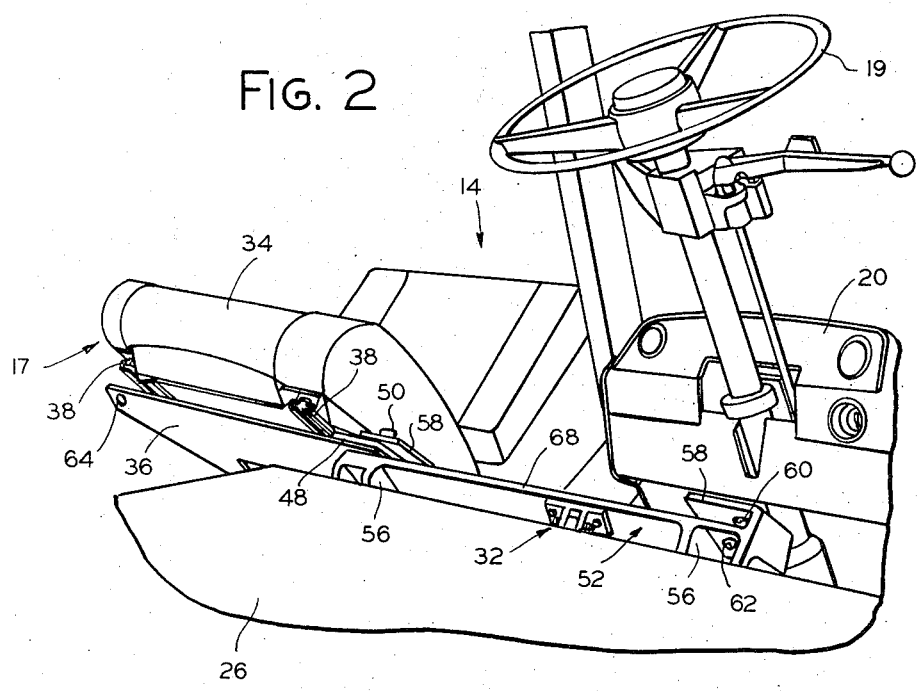
FIG. 2 is an enlarged perspective view showing a portion of the driver's station of FIG. 1 wherein the operator's seat has been actuated to an outwardly pivoted non-operative position.
Figure 3:
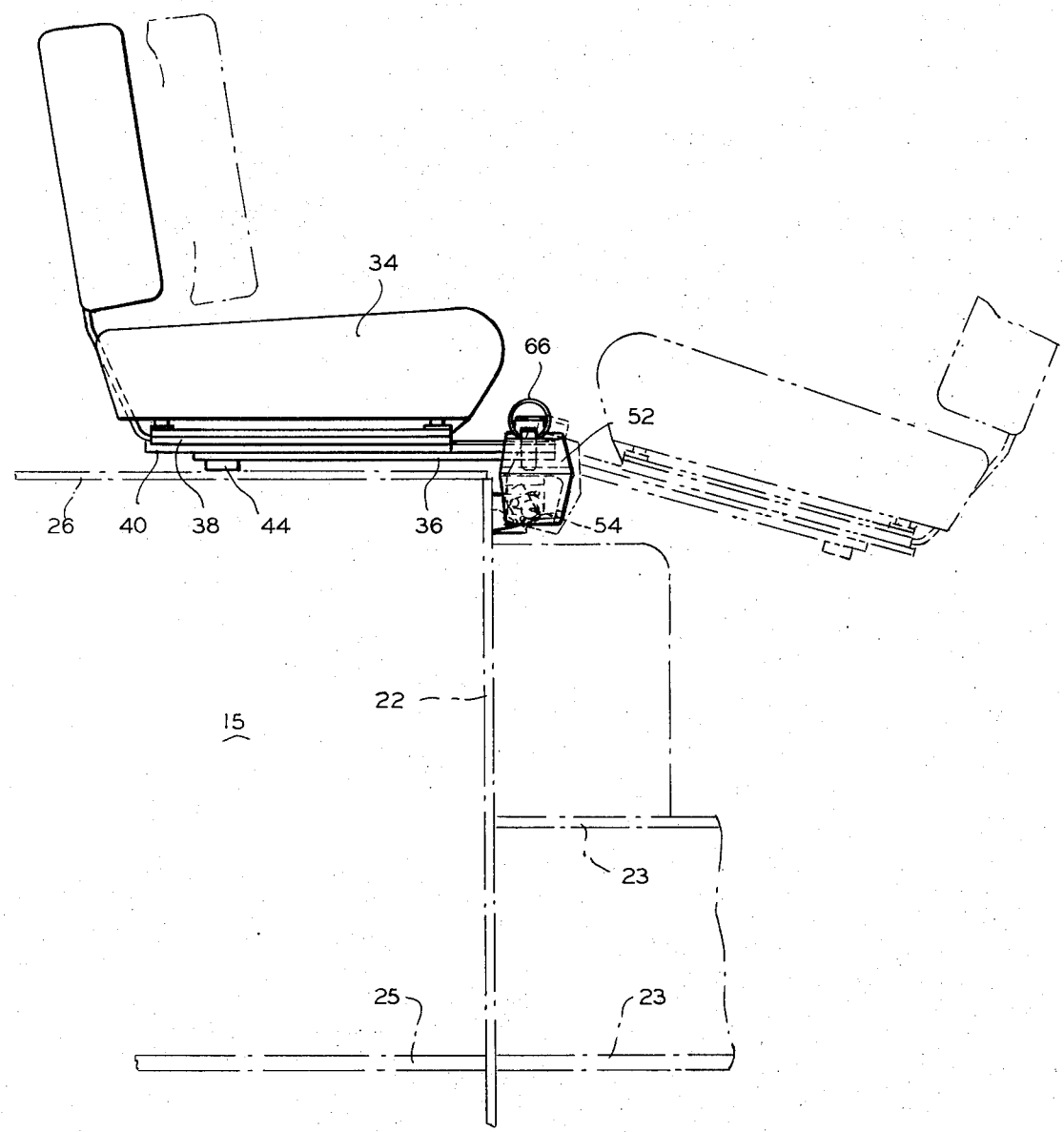
FIG. 3 shows in partial phantom view an enlarged brokenaway side elevation of a portion of the operator's station wherein the driver's seat is illustrated in both operative and swung-out positions in relation to the station.
Figure 4:
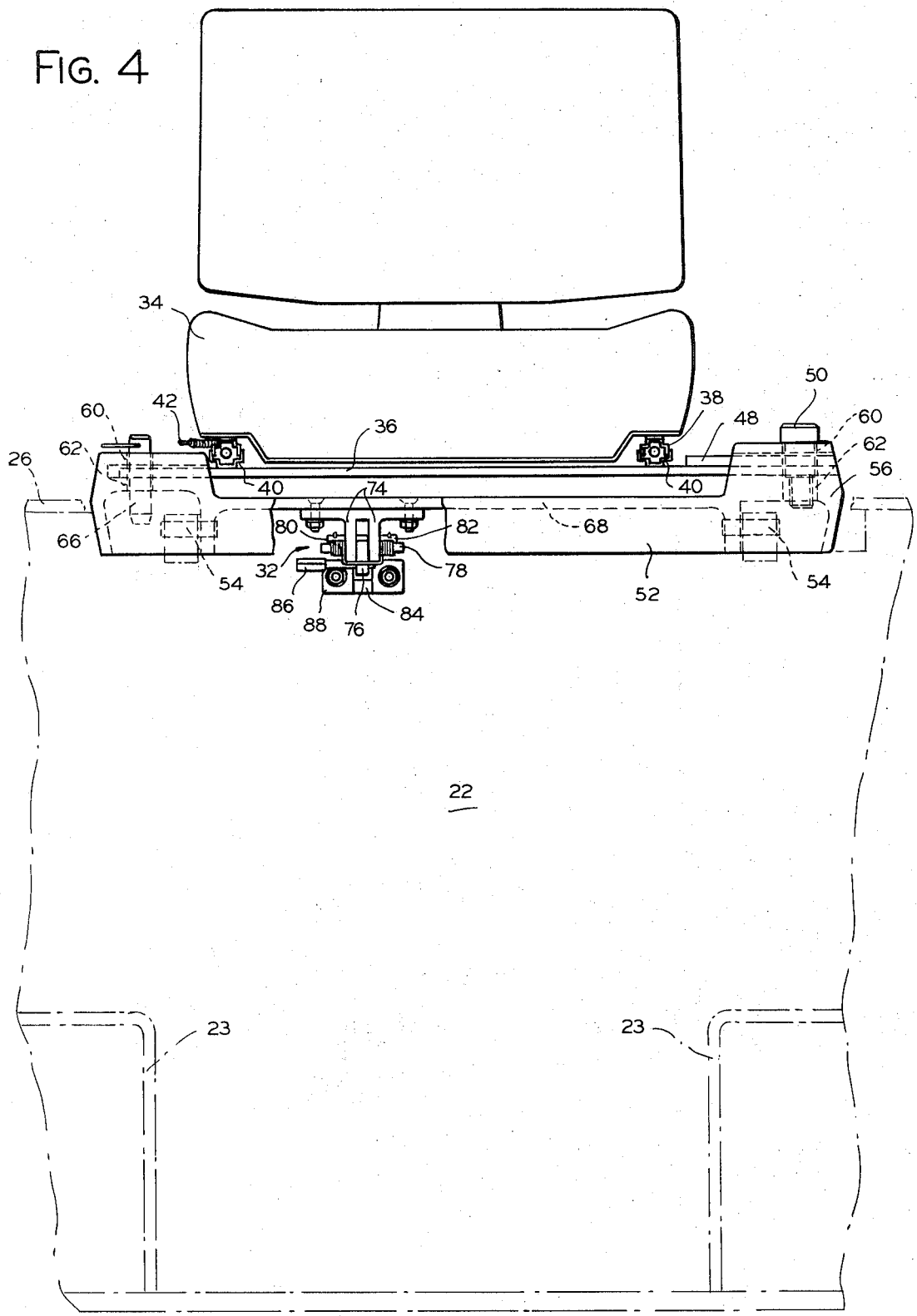
FIG. 4 is a front view of FIG. 3 which shows the operator's seat in its normal operative position and tilted forwardly by the device of this invention.

The battery compartment 15 is formed longitudinally between the forward surface of the counterweight assembly and the vertical transversely extending front body plate member 22 which is secured at opposite sides to longitudinal truck frame members 23; it is formed laterally between demountable vertical longitudinally extending side plate members 24, and it is formed vertically between a battery support floor and truck frame member 25, which is secured at its longitudinal and forward transverse edge portions to longitudinal and transverse truck frame members, and a normally closed hood plate 26 suitably hinged to forward plate 22 for forward pivotal movement when seat assembly 17 is located in the swing-out position shown in FIGS. 2 and 3, as will be described in detail below. Ready access to the storage battery located in the compartment and supported by floor portion 25 is thus provided.

The swing-out operator's seat assembly 17 is tiltable forwardly from the operative solid line position shown in FIG. 1 to the broken line position shown therein and is then swingable to a rearwardly facing position as best shown in FIGS. 1 and 3, the seat assembly being constructed and mounted on the truck in a manner similar to the disclosure thereof in the above identified applications.

The improvement which comprises the invention of the present application is the combination with such swing-out seat assembly of a spring urged striker and abutment subassembly 32 for holding the seat assembly in a tilted position with respect to the vehicle body, and the provision of a release handle for allowing the seat to resume its operative non-tilted position.

The seat per se is indicated at numeral 34 and may be of conventional design preferably embodying spring type cushions for driver comfort. It is mounted for forward and rearward sliding adjustment on a seat carrier plate 36 by conventional C-shaped slotted track means 38 secured at opposite sides of the bottom surfaces of the seat and in registry with out-turned flanges of fixed tracks 40 which are secured to the body's supporting plate 36. Spring loaded hand-operated linkage means 42 of known construction is operable to release the seat structure for forward and rearward sliding adjustable as movable track portions 38 are actuated along fixed track portions 40 for adjustment in the manner indicated in FIG. 3 by the solid line and broken line showings of the backrest portion of the seat 34.

Figure 5:
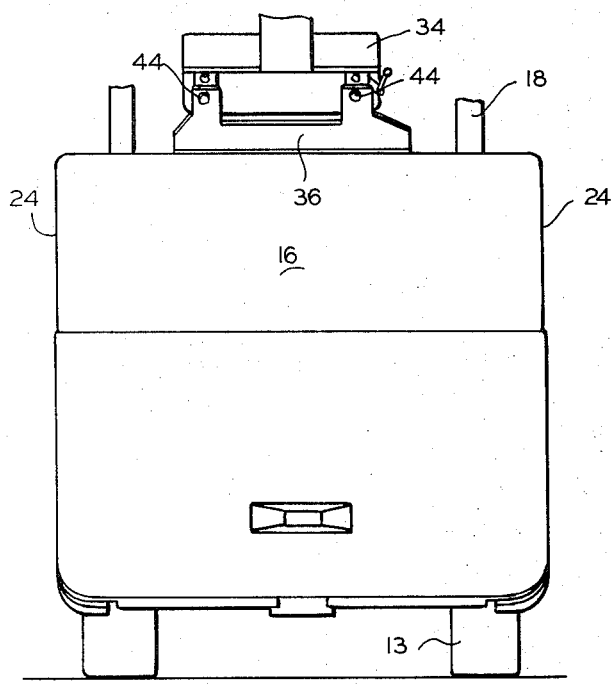
FIG. 5 is a partial rear elevational view of the truck as shown in FIG. 1.
Figure 8:
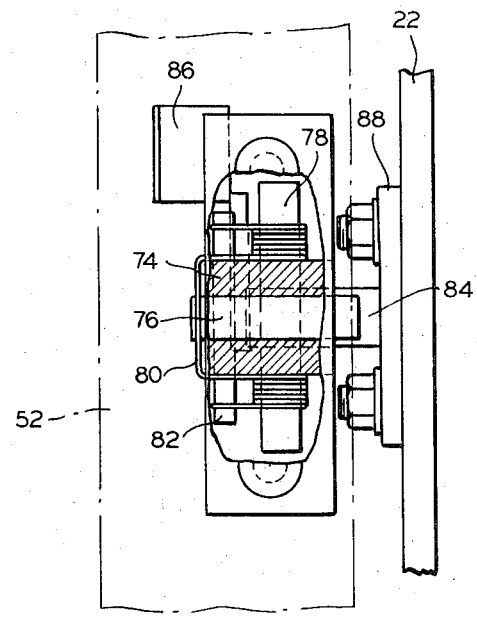
FIG. 8 is a plan view of FIG. 6.
Figure 6:
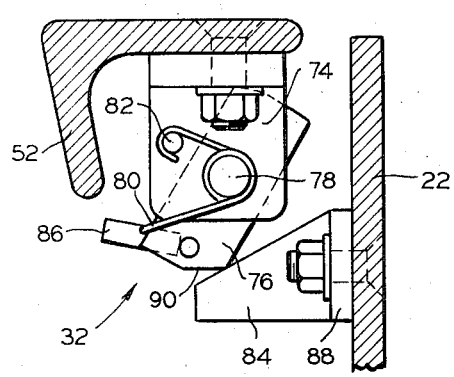
FIG. 6 is a sectional view taken along line 5—5 of FIG. 4, but showing the seat in a non-tilted position.
Figure 7:
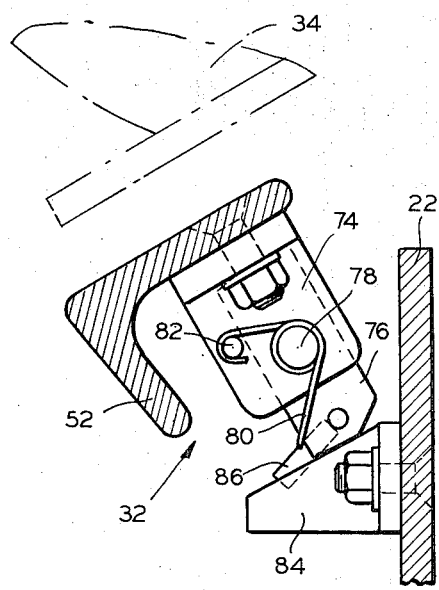
FIG. 7 is the same as FIG. 6 except it illustrates the device of the present invention as it functions to tilt the seat forwardly as in FIG. 4.

Seat support plate 36 is of a generally U-shaped configuration, as shown in FIG. 5, having short cylindrical support buttons 44 adjacent the outer ends of the legs for supporting the plate in a position generally parallel to and spaced vertically from the hood member 26 when an operator is located on the seat, which is the operative position of the seat. Plate 36 has a front left corner reenforcing spacer plate portion 48, which corner portion is pivotally mounted by a pivot pin 50 from the left end portion of a transversely extending seat assembly mounting casting 52 which is supported for forward pivotal movement about a pair of transversely spaced horizontal pivot pins 54 from a normal operating position thereof as shown in FIGS. 1 and 6 to a forwardly pivoted position thereof as best shown in FIGS. 2 and 7. Mounting casting 52 includes generally inverted U-shaped end bracket portions 56 having vertically spaced and inwardly extending corner plate portions 58 mounted from each said bracket portion 56 and axially aligned openings 60 and 62 formed in the respective spaced plate portions at both ends of casting 52. Complementary openings 64 are formed in opposite front corner portions of plate 36, said pivot pin 50 being mounted to extend through the respective openings 60, 62 and 64 for swinging movement of the seat assembly to and from the left side of the truck, a locking pull-out pin and hand ring 66 being registrable with right side openings 60, 62 and 64 when the seat plate 36 is in position in the space between upper and lower plate portions of right end bracket 56, said pin 66 maintaining the seat in said position except, of course, when the pin is removed for pivoted swing-out operation of the seat as shown. Casting 52 includes a connecting top plate member 68 between the end brackets 56.

With the seat 34 swung-out on plate 36 to an approximately 180° transversely displaced position as illustrated in FIGS. 2 and 3, it is apparent that hood member 26 can be elevated, thereby exposing the top side of the battery compartment 15.

Up to this point the disclosure duplicates in all essential respects the swing-out seat construction associated with the lift truck as disclosed and claimed in the above-identified prior divisional application. The improvement which comprises the present invention involves particularly in combination with the above-described swingout seat assembly the device shown best in FIGS. 4 and 6–8, which functions to control forward tilting of the tiltable seat assembly with respect to the truck body. A striker 76 is mounted on the seat or vehicle body, an abutment 84 is secured to the vehicle body or seat for engagement by the striker, and a spring 80 biases the striker into torsion engagement with the abutment to hold the seat in a tilted position with respect to the vehicle body. The striker is preferably provided with a release handle 86 for disengaging it from the abutment and so allowing the seat to resume its operative position.

Now with more particular reference to the structure of the seat tilting device, on the seat casting 52 is bolted a striker housing 74 in which the striker 76 is mounted on a pivot shaft 78. Around the shaft 78 is wound the coil spring 80 biasing the striker counterclockwise as seen in FIGS. 6 and 7. The coil spring 80 is hooked at each end over a stop pin 82 secured in the housing 74, and at the center contacts the striker 76 biasing it towards the abutment 84. The striker has a release handle 86. The abutment 84 is integral with an abutment bracket 88 bolted on the battery case front plate 22.

When the seat 34 is tilted forwardly by hand, the spring 80 biases the striker 76 counterclockwise into engagement with the abutment 84 as shown in FIG. 7. Contact between a cut-away face 90 of the striker 76 and the abutment 84, the face 90 being parallel to the base plate 36 of the seat 34 and separated from it as shown, maintains the seat in a tilted position until it is released by the operator. With the pin 66 removed, and the seat swung with respect to the truck body away from its operative position, as in FIG. 2, the battery can be serviced. Then the seat can be swung back into its operative position, and the pin 66 replaced to secure the seat with respect to the casting 52. In order to return the seat to its operative position, the seat is first pulled into a slightly more tilted position to disengage surface 90 of striker 76 from the complementary surface of abutment 84, whereupon the release handle 86 is lifted so as to move the striker clockwise and torsion the spring 80 in a direction opposite to its normal bias, whereupon the seat is allowed to fall back into its operative position.

In general it will now be seen that when the seat is tilted manually forwardly the spring biases the striker into a locking engagement with the abutment so that the seat is held in a tilted position. The seat is also mounted so as to be swingable outwardly away from its operative position, to enable servicing, removal and installation of batteries in the compartment normally underneath the seat. Following such servicing, the seat is swung back into its operative position, the striker is released and the seat is thus allowed to resume its operative position.

It will be apparent to those skilled in the art that various changes in the structure and relative arrangement of parts may be made without departing from the scope of my invention.

I claim:

1. An operator's seat assembly for industrial trucks and the like comprising mounting means extending transversely of the truck and supported from the truck for pivotal movement about transverse pivot means in a direction longitudinal of the truck, operator's seat and support means connected to said mounting means from one end thereof about vertical pivot means and detachable from the opposite end thereof for enabling the seat and support means to be actuated transversely outwardly from a forwardly facing operative position for operating the truck to a rearwardly facing non-operative position extending transversely outwardly of one side of the truck, and means for pivoting said mounting means and seat and support means about said transverse pivot means including a housing secured to the mounting means and pivotable therewith, an abutment secured to the truck in vertically spaced relation from the housing, and spring urged striker means mounted operatively between the housing and abutment for urging the seat and support and mounting means toward a forwardly pivoted position about said transverse pivot means, said striker, including a transverse shaft mounted from said housing, a coil spring on said shaft operatively connected to the mounting means and to a striker element urging the latter into abutment with the abutment means.

2. An operator's seat assembly as claimed in claim 1 wherein a release handle is connected to said striker element for actuating the latter element and the coil spring so that the seat assembly may be then manipulated from a forwardly pivoted position to a non-pivoted operative position.

3. An operator's seat assembly as claimed in claim 1 wherein complementary biased surfaces are formed on said abutment and striker means for holding the seat assembly in a forwardly pivoted position when such surfaces are actuated into abutment with each other.

* * * * *